United States Patent [19]

Crosby et al.

[11] Patent Number: 4,520,736

[45] Date of Patent: Jun. 4, 1985

[54] LIGHTWEIGHT SAFE AND DOOR MECHANISM THEREFOR

[75] Inventors: Gaius P. Crosby, Orem, Utah; Thomas A. James, 341 S. Main, Mapleton, Utah 84663

[73] Assignee: Thomas A. James, Mapleton, Utah

[21] Appl. No.: 492,499

[22] Filed: May 6, 1983

[51] Int. Cl.³ ........................ E05B 63/00; G05B 63/18

[52] U.S. Cl. ........................ 109/60; 109/63.5; 70/1.5

[58] Field of Search .................. 70/1.5, 104, 416, 432; 292/36; 109/59, 60, 61, 38, 63.5

[56] References Cited

U.S. PATENT DOCUMENTS

| | | | |
|---|---|---|---|
| 2,609,679 | 9/1952 | Bremer et al. | 70/1.5 |
| 2,996,322 | 8/1961 | McClellan | 109/59 |
| 3,076,420 | 2/1963 | McClellan | 109/38 |
| 3,371,628 | 3/1968 | McClellan | 109/59 |
| 4,413,493 | 11/1983 | Meinsen et al. | 70/1.5 |

*Primary Examiner*—Gene Mancene
*Assistant Examiner*—John G. Weiss
*Attorney, Agent, or Firm*—Trask & Britt

[57] ABSTRACT

A lightweight safe having an unique door mechanism is disclosed. The lightweight safe has a front opening with a recessed door frame to accommodate a recessed door having dead-bolts which are positioned behind one edge of the door frame when the door is in a closed position and movable locking bolts which may be locked behind an opposed edge of the door frame when the door is in a locked condition. The opening mechanism involves the use of a locking shaft having a pair of roll pins which interact with a handle lever to provide a smooth acting opening mechanism and to provide shear means in the event the handle of the safe is forced when the safe is in a locked condition.

8 Claims, 10 Drawing Figures

LIGHTWEIGHT SAFE AND DOOR MECHANISM THEREFOR

BACKGROUND OF THE INVENTION

1. Field

The instant invention relates to a lightweight safe construction and to a secure, quick-opening, fail-safe, locking system.

2. Prior Art

Various types of locking mechanisms have been devised for locking cabinets and safes. Most of the systems devised have been related to very heavy-duty safes.

A typical double-acting, locking mechanism for a safe door is illustrated in Donovan, U.S. Pat. No. 4,288,944. Another system is illustrated in U.S. Pat. No. 393,883 of Brown, which involved a triple locking bar mechanism in association with fixed studs along one edge of the door.

Other door mechanisms include the locking mechanism of Stevens, U.S. Pat. No. 1,122,550, the vault closure of Weganer, U.S. Pat. No. 1,929,341, a door lock of Pyle, U.S. Pat. No. 1,870,746, the locking mechanism of McClellan, U.S. Pat. No. 2,996,322, the locking mechanism of Watson, U.S. Pat. No. 2,823,536.

OBJECTS OF THE INVENTION

It is an object of the instant invention to provide a rugged, secure, lightweight safe which is easily constructed.

Another object of the instant invention is to provide a lightweight safe with a secure door and fail-safe locking mechanism.

Another object of the instant invention is to provide a lightweight safe which may be readily unlocked and opened after the handle mechanism has been broken.

DESCRIPTION OF THE INVENTION

Figure 1:
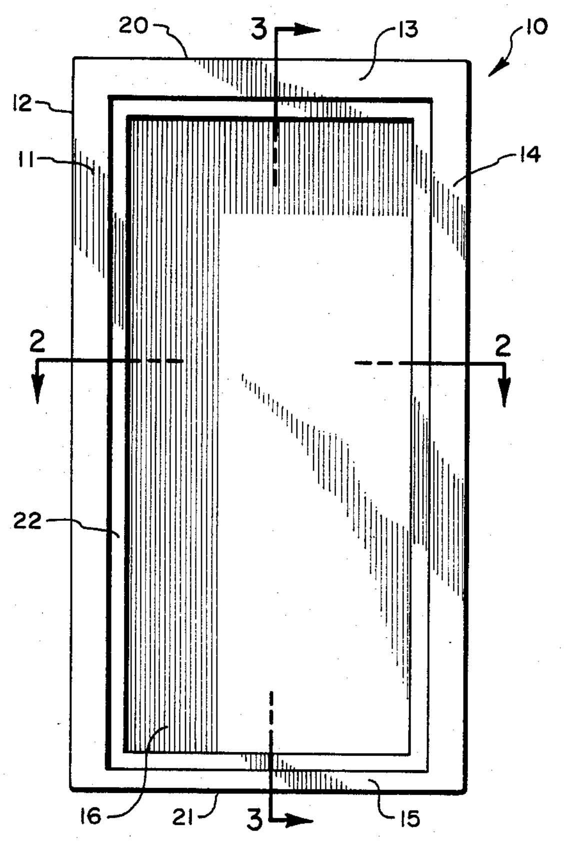
FIG. 1 is a front elevational view of a lightweight safe of the instant invention with the door removed.

A lightweight safe for household use having sturdy construction and a tamper-proof door has been invented. The lightweight safe has a single-hinged door recessed within an offset door frame. The safe is a box-like structure having a marginal front face and a substantial opening in the face to accommodate the door. The safe has a top, bottom, back and vertical side panels all joined together. Typically, the back and side panels are formed from one piece of metal sheet. The side panels are further joined to the marginal face to form an open box-like structure. The door is attached to the safe by a plurality of hinges along one vertical edge of the door.

The top and bottom of the safe are joined to vertical side panels by welding. The marginal front face is formed by folding an edge of the top, bottom and side panels at a 90° angle to the top, bottom and side panels. Each panel edge is further folded to be directed inwardly and preferably has two additional folds to form a zigzag structure. The door frame is formed by the folded edges of the vertical, top and bottom panels.

The door has a plurality of fixed studs or deadbolts attached along one edge of the door. The studs are spaced inwardly of the hinges whereby the studs are recessed behind the door frame when the door is in a closed position. A plurality of sliding bolts are located along a non-hinged vertical side of the door of said sliding bolts positioned to slide behind the door frame when the door is closed. The sliding bolts pass through openings in a vertical panel of the door.

The door has a vertical movable bolt bar located within a box-like frame structure which is attached to the flat face panel of the door. The vertical movable bolt bar is attached to the sliding bolts.

An actuator mechanism is fixed within the door structure to cause the bolt bar to reciprocate laterally thereby causing the sliding bolts to slide behind the door frame and retract therefrom. The actuation mechanism comprises a horizontal, movable, locking shaft attached to an inside edge of the vertical bolt bar. The locking shaft has a pair of roll pins protruding from the side of the locking shaft and protruding towards the interior of the safe when the door is in a closed position. The roll pins are spaced apart a predetermined distance, the pins being of a sufficiently light construction that significant shear forces applied thereto cause the shearing of these pins.

A lock-actuated bolt interacts with the locking shaft to secure it in a locked position whereby the movable locking shaft is in a forward position so that the vertical bolt bar is near the interior edge of a door panel thereby causing the sliding bolts to protrude from the panel and be positioned securely behind the door frame when the door is in a closed position.

Handle means located on the outside face of the door are attached to a substantially vertically disposed, swingable handle lever located on the inside of the front face of the door. The lever is disposed between the spaced roll pins on the locking shaft whereby the lever swings away from a substantially vertically position to a position at a sufficient angle to a vertical position to move the locking shaft to a closed position. The lever in such a closed position occupies substantially the entire space between the roll pins.

Further description of the instant invention may be facilitated by reference to the attached drawings. FIG. 1 is an elevational frontal view of the lightweight safe of this invention. The safe 10 has a front face 11 which is composed of four sections 12, 13, 14, 15 which are narrow folded margins of the side, top and bottom panels. The front face is a narrow peripheral border around the door opening 16. The body of the safe is formed essentially from five panels, a back panel 17, two side panels 18 and 19, a top panel 20, and a bottom panel 21. A door frame 22 is formed by folding the margins of the side, top and bottom panels inwardly to form a pair of vertical door jambs 23 and 24, a door sill 25 and a lintel 26. A peripheral door frame flange or rim 27 is formed by a reverse bend and an interframe 28 is formed by a further inward bend of the sides, top and bottom. This step-wise structured door frame is particularly strong for a lightweight metal safe. The sidewall thickness of the metal sheet used in forming the safe is from about 3/32 inch to about ¼ inch with about ⅛ inch to about 3/16 inch being a preferred thickness.

Figure 4:
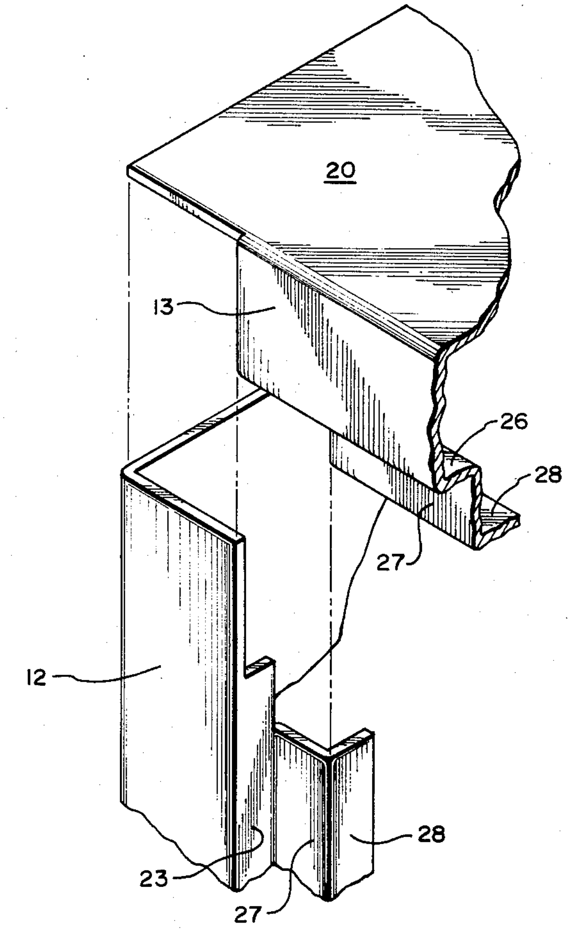
FIG. 4 is an exploded view of the top panel attachment to a side panel.

A further illustration of the safe construction is illustrated in the exploded view of FIG. 4 which shows the step-wise folding of a side panel to form a vertical face panel 12, the door frame jamb 23, the peripheral rest for the door 24 and the inward fold 28 to form an interframe. The top is folded in a similar fashion to form a marginal face 13. The lintel 26, the door rim or flange 27 and the inwardly turned frame 28. The top and bottom are further joined at seams which have horizontal and vertical runs rather than a diagonal seam so that maximum strength is achieved in the event that an attempt is made to pry the top away from the sides of the safe. The step-wise of zigzag seam formed on the step-wise frame offers maximum strength. In the event the top is attempted to be pried away from the side, the vertical seams will offer maximum resistance. If the side is attempted to be pried away from the top, the horizontal seams offer maximum resistance. Also, this method of seaming gives longer seam length than a diagonal seam, thus further increasing the strength of the joint. Also, any blow with a sledge hammer or chisel or other item against the seam does not send a stress wave along the length of the seam as occurs in a diagonal seam.

Figure 2:
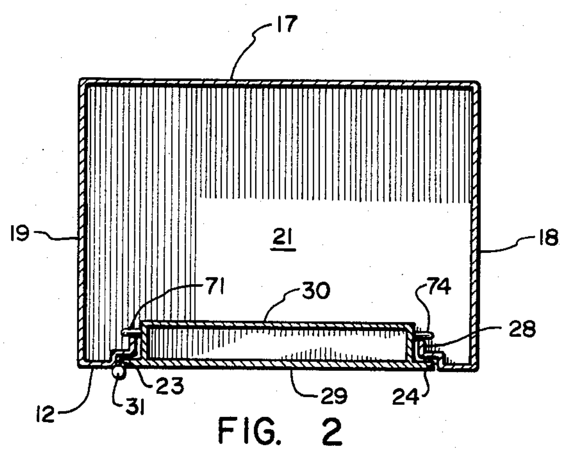
FIG. 2 is a plan view of the safe of FIG. 1 along section lines 2—2 with the door in place.
Figure 3:
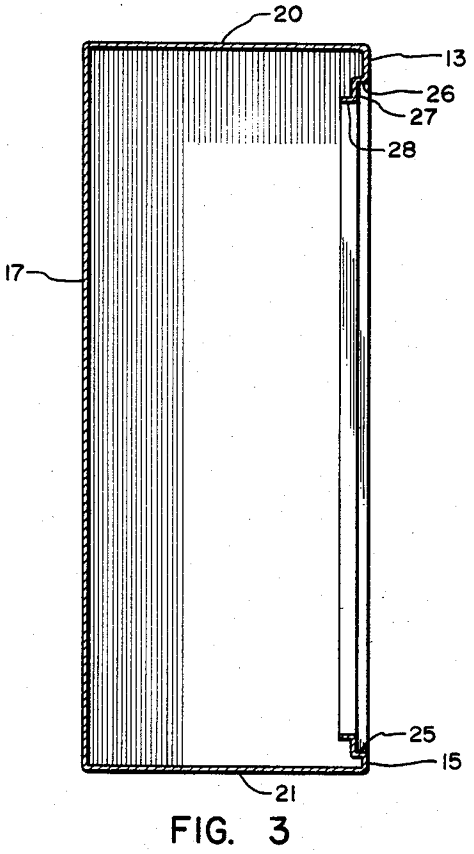
FIG. 3 is an elevational sectional view along section lines 3—3 of FIG. 1.
Figure 5:
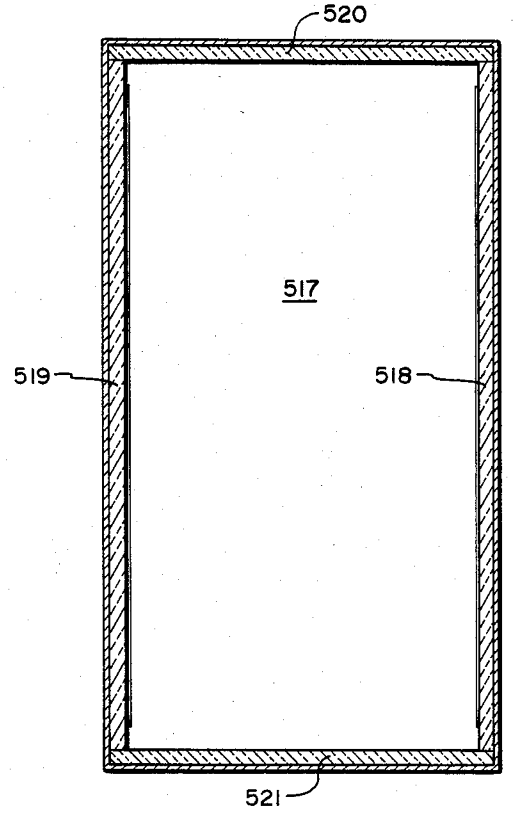
FIG. 5 is an front elevation, sectional view of an interior safe modification.
Figure 6:
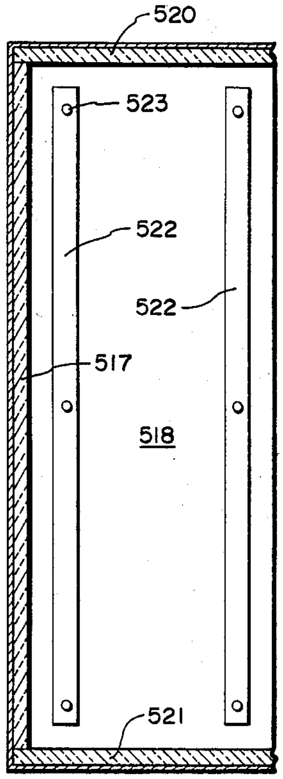
FIG. 6 is an side elevation, sectional view of the safe construction of FIG. 5.

A fire-resistant liner for the safe shown in FIGS. 1 through 3 is illustrated in FIGS. 5 and 6. An interior lining for the safe is formed of gypsum board, plaster board or similar inorganic material which is incombustible. The top panel 520 and bottom panel 521 are cut to fit the interior of the safe. Rear panel 517 is also cut to fit the rear panel of the safe except that it is slightly shorter to accommodate the thickness of panels 520 and 521. Side panels 518 and 519 are slightly shorter and slightly narrower than the height and depth of the safe in order to accommodate the thickness of panels 520, 521 and rear panel 517. Thus, side panels 518 and 519 hold rear panel 517 and top and bottom panels 520 and 521 in place.

Panels 518 and 519 may be held in place as illustrated in FIG. 6 wherein metal strips 522 are vertically positioned within the safe against the outer faces of side panels 518 and 519. Strips 522 are held in place by studs 523 which protrude through the interior panels 518 and 519 to attach to the walls of side panels 18 and 19 of the safe. These studs may be spot-welded or attached by rivets or other means to the sides of the safe. Strips 522 are useful then in holding shelves in place within the safe inasmuch as brackets may be attached to these strips.

The door face 29 is a flat sheet of metal, as illustrated in FIG. 2, and is hinged by hinges 31 along one vertical edge of the door to the marginal face of the safe adjacent to the outer margin so that the front panel of the door recesses within the door frame, as illustrated in FIG. 2. A box-like member 30 is formed on the interior of the door face 29 so that it protrudes through the door frame.

Figure 7:
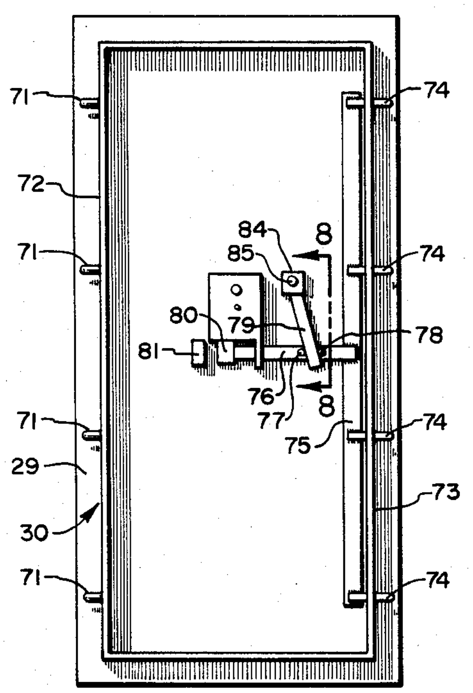
FIG. 7 is an elevational view of a safe door construction illustrating a locking mechanism.

The door locking mechanism is illustrated further in FIG. 7. Along the hinged side of the door 73, a plurality of deadbolts or fixed studs 71 are attached to a vertical panel 72 of the box-like frame 30. Usually a minimum of three deadbolts are utilized with one deadbolt positioned close to the top and another close to the bottom of the door. The vertical spacing between the deadbolts is usually in a range of from about six inches up to about 16 inches. On heavy-duty safes having sidewalls of 3/16 inch material, the spacing is usually less than about eight inches, while on lightweight safes having sidewalls of ⅛ inch metal, the spacing is generally less than about 16 inches.

Along an opposite vertical panel of the door 73 a plurality of locking bolts or locking studs 74 are found attached to a locking bar 75. The lateral reciprocation of the locking bar causes the projection and retraction of the locking bolts 74. Movement of the locking bar 75 is controlled by a locking shaft 76 which is positioned substantially horizontally along an interface of the door. The locking shaft has a pair of roll pins 77 and 78 projecting therefrom. Preferably, the roll pins project towards the interior of the safe when the door is closed. The roll pins interact with a handle lever 79 which is positioned between the roll pins.

As the handle lever 79 moves the locking shaft 76 to a locked position, thus causing the projection of locking bolts 74, the handle lever 79 is at a slight angle to the vertical. Thus, the space between roll pins 77 and 78 is filled by the diagonal distance along the width of the handle lever so that anyone moving the handle, which is located on the exterior side of door face 29, will feel a very solid feel since there is no play and no movement of the handle lever between the roll pins. Thus, the safe has a very secure, strong feel to anyone attempting to move the handle when the safe is in a locked condition.

In between the locking bar and the innerbox-like frame 30 may be interposed small thin rubber pads whereby the locking bar may be forced in a closed position to compress slightly such thin rubber pads or washers. Thus, when the lock-actuated bolt 80 is placed in a locked position so that it abuts against the free end of locking shaft 76, locking shaft 76 may be permitted to rebound slightly from the compressed rubber gaskets or washers. Intimate contact is made between lock-actuated bolt 80 and the free end of locking shaft 76.

Locking shaft 76 is permitted to have a certain throw or traverse movement between a locked position and an unlocked position. When lock-actuated bolt 80 is actuated to be in an unlocked or up-position, then locking shaft 76 may be moved from a normally locked position to an unlocked position whereby locking shaft 76 comes in contact at its free end with stop 81.

The roll pins 77 and 78 also serve as shear pins and are sized so that any undue force which is applied to the handle on the outer face of the door (not shown) which causes handle lever 79 to be forced against one of the other of the roll pins with an excessive force will cause such roll pin to shear, thereby permitting handle lever 79 to move freely. In this fashion, anyone attempting to tamper with the safe will cause one or both shear pins 77 and 78 to break thereby preventing the application of any great force upon the key actuated bolt 80. Once the shear pin 77, for example, is broken then the safe cannot be opened by use of the handle (not shown). However, to open the safe, the lock-actuated bolt 80 is then unlocked and moved to an up position. The safe may then be laid upon its side opposite the moving locking bolts 74 so that the weight of the locking bar 75 and the force of gravity causes the locking bolts 74 to retract. Thus, the safe can be opened in this fashion and the roll pin replaced. The lock which actuates bolt 80 may be of any conventional key-operated or combination-operated type.

Figure 8:
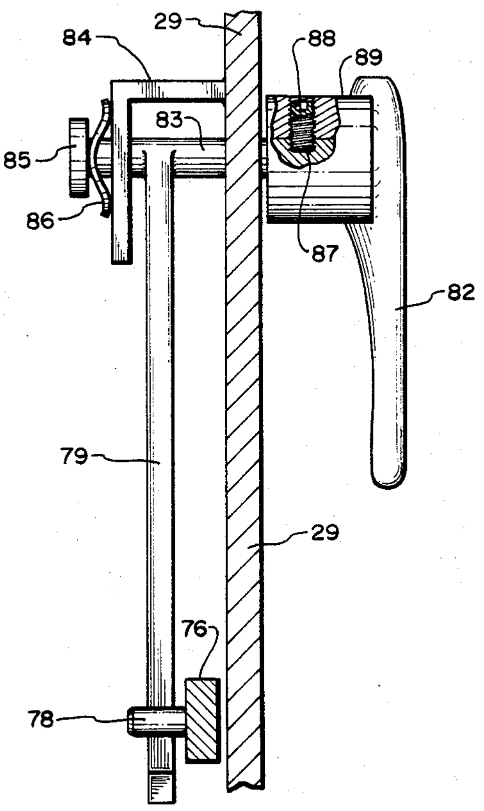
FIG. 8 is a section view of a safe door handle mechanism taken on section line 8—8 of FIG. 7.

In FIG. 8 there is shown a construction for the mounting of the handle 82 upon shaft 83 to which handle 79 is attached. An angle bracket 84 is secured, for example by welding or other means, to the interior side of door face 29. Shaft 83 may be a bolt with a head 85 on one end. A resilient washer, for example a wavey washer, 86 is placed between the bolt head and the bolt face 85 of bracket 84. The bolt head 85 is pressed against the wavey washer 86 to compress the washer. This projects the bolt through door face 29 so that a recess 87 on the bolt comes in alignment with a bore 88 on the hub 89 of handle 82. A set screw or other means may be used to attach the hub 89 to the shaft 83. Once the set screw is in place in bore 88, the surface opening of the bore 88 may be closed by welding or other means. Other fastening techniques, of course, may be used. Thus, the slightly compressed washer 86 will tend to place a bias on the head 85 of shaft 83 to force the hub 89 against the outer surface of door face 29. This again gives the handle a very solid feel so that even though a lightweight safe is used it has a very solid secure feeling.

Figure 10:
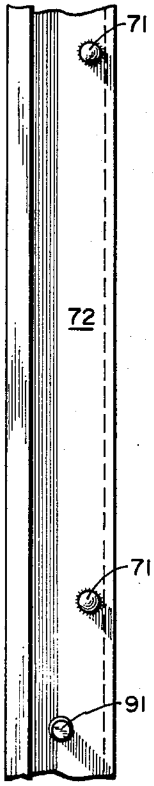
FIG. 10 is an elevational edge view of a safe door having a modified closing mechanism.
Figure 9:
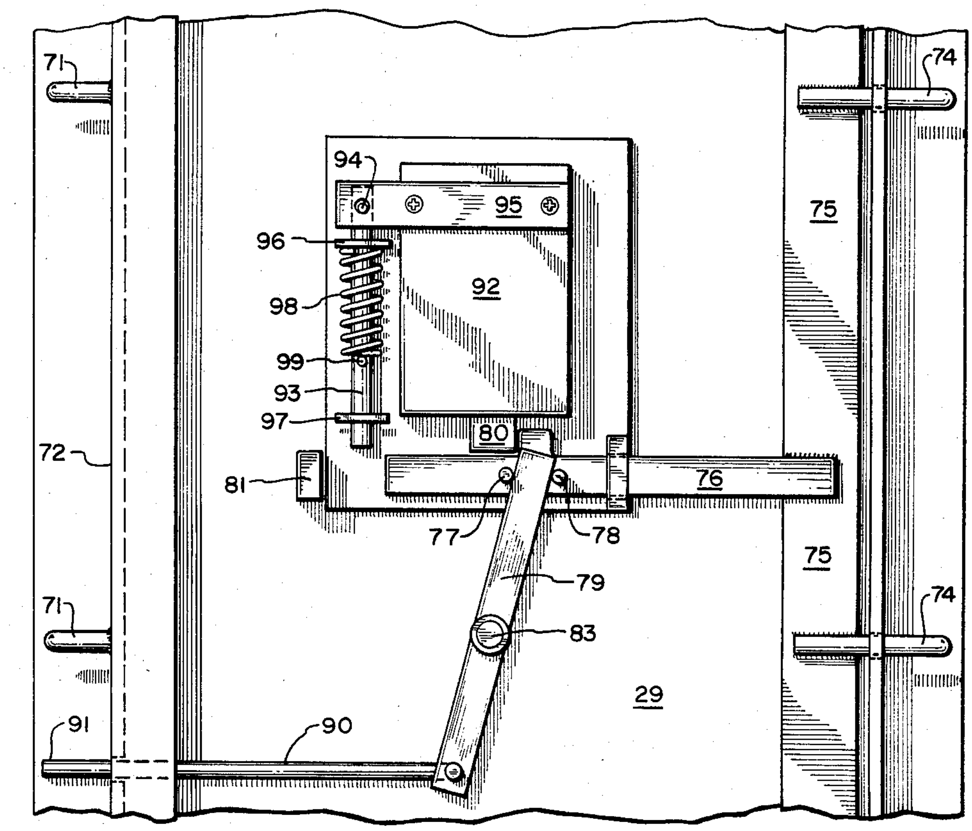
FIG. 9 is an elevational, face view of a modified safe door locking and closing mechanism.

Another useful feature of the instant lightweight safe is illustrated in FIGS. 9 and 10. A trip rod 90 is connected to a free end of handle lever 79. (Lever 79 and axle 83 are shown in a slightly different location in FIG. 9 as compared with FIG. 7.) The distal end 91 of rod 90 makes contact with inner door frame 28 as the door is being closed. The contact of end 91 with the door frame forces rod 90 towards lever 79, causes lever 79 to rotate counterclockwise, thereby retracting locking shaft 76 and retracting movable bolts 74, as the door moves to a fully closed position, rod end 90 slides off door frame 28 and rests behind door frame edge along with fixed studs 71.

This trip feature ensures that the door is not accidentally slammed shut with the movable studs 74 in a protruding position.

Also illustrated in FIG. 9 is a dual lock system to prevent the safe from being unlocked by a force which displaces lock mechanism 92 from interior side of door face 29. One way to force open a lightweight safe is to cut an opening in the door face at the lock mechanism location. A chisel or other tool can then be hammered against the lock mechanism until it is "knocked-off" the inner door face. With many safe constructions, this permits the safe to be opened by turning of the handle.

In the dual lock or backup lock mechanism shown in FIG. 9, a second locking bolt 93 is positioned above the free end of locking shaft 76. Bolt 93 is held in a raised (open) position by pin 94 which fits within a detent or core in bolt 93. Bolt 93 is held in place by strap 95 attached to the rear plate of mechanism 92. Pin 94 acts as a bolt release when removed from bolt 93.

Bolt 93 is oriented in a vertical position by metal loops 96 and 97 attached to the interior surface of door face 29. Bolt 93 passes through the openings in loops 96 and 97. Spring 98 butts against upper loop 96 and is held in a compressed state by spring pin 99 attached to bolt 93 at a mid-position, i.e., pin 99 is spaced above loop 97 a sufficient distance to permit spring 98 to force spring pin 99 downward a sufficient distance before pin 99 contacts loop 97 to cause the lower end of bolt 93 to come to rest behind the free end locking shaft 76.

Bolt 93, of course, could be actuated by gravity without a spring bias. A gravity actuated bolt preferably has sufficient means to operate effectively. A spring bias, however, is generally preferred inasmuch as the dual lock mechanism will then work regardless of the orientation of the safe, i.e., the safe can be upside down and the dual lock mechanism of this instant invention will effectively operate.

Although the safes of the instant invention are fabricated from fairly lightweight metal, that is, from about $\frac{1}{8}$ inch to about 3/16 inch, and preferably about $\frac{1}{8}$ to about 3/16 inch, the safes are very secure and have a very solid feel. For example, the step-wise folding of the margins of the panels to form the door frame, see FIG. 2, provide a particularly rigid structure whereby the bolts 71 and 74 may rest behind the turned-in edges of the side panels. Thus, anyone attempting to force a crowbar or other lever between the edge of door face 29 and the edge of the face 12, such a prying action will merely force bolt 71 against the turned-in edge of the door frame.

Typical lightweight safes weigh about 200 to about 1,000 pounds and have an interior volume of about ten cubic feet to about thirty cubic feet.

We claim:

1. A lightweight safe having a hinged door recessed in an offset door frame, said safe comprising:
   - a box-like structure having a marginal front face, a full back panel parallel to said front face, vertical side panels and top and bottom panels perpendicular to said front face and joining said back panel to said front face to form an open box-like structure;
   - a plurality of hinges along one vertical edge of said door to attach said door to said door frame adjacent said marginal front face;
   - a door having a face panel to which hinges are attached along one edge and vertical panels on the inside of said door, said vertical panels perpendicular to said door face panel; and
   - a first lock mechanism comprising:
     - a plurality of fixed studs attached along one edge vertical panel of said door and spaced inwardly of said hinges whereby said studs recess behind said door frame when said door is in a closed position,
     - a plurality of sliding bolts located along the non-hinged vertical edge of said door, said sliding bolts positioned to slide behind the door frame when the door is closed, said sliding bolts pass through openings in a vertical edge panel of said door,
     - a vertical, movable bolt-bar located within the box-like structure on the inside of the vertical edge panel through which the sliding bolts pass, said bar attached to the proximate ends of said sliding bolts, and
     - an actuator mechanism to cause said bolt-bar to reciprocate, thereby causing said sliding bolts to slide behind said door frame and retract therefrom, said actuator comprising:
       - a horizontal movable locking shaft attached to an inside edge of said vertical bolt-bar, said locking shaft having a pair of roll pins protruding from the side of the shaft and protruding towards the interior of said safe, said roll pins spaced apart a predetermined distance, said pins being of sufficiently light construction that significant shear forces applied thereto will cause shearing of said pins, a lock-actuated bolt to hold said locking shaft securely in a locked position whereby the movable locking shaft is in a position such that the vertical bolt-bar causes the sliding bolts to protrude from the panel and position themselves securely behind the door frame when the door is closed, and handle means attached to a substantially vertically disposed, swingable handle lever located on the inside of said front face of the door, said lever disposed between said spaced roll pins on said locking shaft whereby said lever swings away from a substantially vertical position to a position at a sufficiently acute angle to a vertical position to move the locking shaft to a locked position.

2. The safe of claim 1 wherein a fixed stud and a sliding bolt are located near the top of the door, and a fixed stud and a sliding bolt are located near the bottom of the door.

3. The safe of claim 1 having stop means to stop the travel of horizontal locking shaft when it is in an open position.

4. The safe of claim 1 wherein said handle lever substantially occupies the entire space between said roll pin when said lever is at a sufficiently acute angle to place the locking shaft in a locked position.

5. The safe of claim 1 wherein said fixed studs and said sliding bolts have a vertical spacing there between of at least about six inches.

6. The lightweight safe of claim 1 having automatic movable bolt retraction means actuated by contact of said bolt retraction means with said door frame when said door is in a partially closed position.

7. The lightweight safe of claim 6 wherein said bolt retraction means comprises a slidable trip rod pivotedly mounted on said handle lever and dimensioned to contact said door frame when said door is in a partially closed position, said contact operating to displace said trip rod and thereby cause said handle lever to retract said bolts.

8. The lightweight safe of claim 1 having a second backup locking mechanism having a spring-actuated bolt held normally in an unlocked position, bolt release means attached to said first lock mechanism in a manner to cause release of said spring-actuated bolt upon physical dislocation of said first locking mechanism.

* * * * *